US012582504B2

(12) United States Patent
Kam et al.

(10) Patent No.: US 12,582,504 B2
(45) Date of Patent: Mar. 24, 2026

(54) METHOD FOR DEFORMING SHAPE OF TOOTH MODEL, APPARATUS FOR DEFORMING SHAPE OF TOOTH MODEL, COMPUTER READABLE MEDIUM HAVING PROGRAM FOR PERFORMING THE METHOD

(71) Applicant: IMAGOWORKS INC., Seoul (KR)

(72) Inventors: Dong Uk Kam, Seoul (KR); Taeseok Lee, Seongnam-si (KR); Jinhyeok Choi, Seoul (KR); Tae-guen Son, Seoul (KR)

(73) Assignee: IMAGOWORKS INC., Seoul (KR)

( * ) Notice: Subject to any disclaimer, the term of this patent is extended or adjusted under 35 U.S.C. 154(b) by 216 days.

(21) Appl. No.: 18/389,728

(22) Filed: Dec. 19, 2023

(65) Prior Publication Data

US 2024/0207018 A1      Jun. 27, 2024

(30) Foreign Application Priority Data

Dec. 22, 2022    (KR) ........................ 10-2022-0182294

(51) Int. Cl.
*A61C 7/00* (2006.01)
*A61C 9/00* (2006.01)
*G06T 7/00* (2017.01)

(52) U.S. Cl.
CPC ............ *A61C 7/002* (2013.01); *A61C 9/0053* (2013.01); *G06T 7/00* (2013.01); *G06T 2207/30036* (2013.01)

(58) Field of Classification Search
CPC ......... A61C 7/002; A61C 9/0053; G06T 7/00; G06T 2207/30036; G06T 19/20; G06T 2210/41; G06T 2219/2021
USPC ............................................. 345/418; 703/11
See application file for complete search history.

(56) References Cited

U.S. PATENT DOCUMENTS

| | | | | |
|---|---|---|---|---|
| 2010/0324875 A1* | 12/2010 | Kalili | ................. | A61C 13/0004 |
| | | | | 703/11 |
| 2020/0005550 A1* | 1/2020 | Schneider | .......... | A61C 13/0004 |
| 2021/0007834 A1* | 1/2021 | Salah | ..................... | G06T 7/0012 |
| 2022/0000582 A1* | 1/2022 | Ziskind | .................. | A61K 6/884 |
| 2022/0175491 A1* | 6/2022 | Ben-Hamadou | ..... | A61C 9/0053 |
| 2023/0390035 A1* | 12/2023 | Lee | ...................... | A61C 9/0046 |
| 2023/0397972 A1* | 12/2023 | Kim | ..................... | A61C 9/0053 |
| 2024/0161431 A1* | 5/2024 | Lafer | ..................... | A61C 13/34 |
| 2025/0014744 A1* | 1/2025 | Juul | ........................ | G06T 19/00 |

FOREIGN PATENT DOCUMENTS

| | | |
|---|---|---|
| KR | 20190020756 A | 3/2019 |
| KR | 20190044067 A | 4/2019 |
| KR | 101994398 B1 | 6/2019 |

(Continued)

OTHER PUBLICATIONS

International Search Report issued on Sep. 12, 2023.

(Continued)

*Primary Examiner* — Prabodh M Dharia
(74) *Attorney, Agent, or Firm* — LEEPI

(57) ABSTRACT

A method for deforming a shape of a tooth model includes generating a plurality of deformation shape models by deforming a tooth template model based on tooth scan data and generating a blended shape model by performing mesh blending on the deformation shape models.

15 Claims, 19 Drawing Sheets

(56) References Cited

FOREIGN PATENT DOCUMENTS

| | | | |
|---|---|---|---|
| KR | 20190125796 | A | 11/2019 |
| KR | 20220028749 | A | 3/2022 |
| KR | 20220029274 | A | 3/2022 |
| KR | 20220056760 | A | 5/2022 |
| KR | 20220066087 | A | 5/2022 |
| KR | 20220072370 | A | 6/2022 |

OTHER PUBLICATIONS

European Extended Search Report issued on May 29, 2024.
Zhao Wang et al., School of Software Tsinghua University, Beijing, China, "Shape Template Based Dental Mesh Repairing", 2019 12th International Congress on Image and Signal Processing, BioMedical Engineering and Informatics (CISP-BMEI).
Yu-Shen Liu et al., "Mesh blending", Visual Comput, 2005, vol. 21, p. 915-927.

* cited by examiner

1

METHOD FOR DEFORMING SHAPE OF TOOTH MODEL, APPARATUS FOR DEFORMING SHAPE OF TOOTH MODEL, COMPUTER READABLE MEDIUM HAVING PROGRAM FOR PERFORMING THE METHOD

PRIORITY STATEMENT

This application claims priority under 35 U.S.C. § 119 to Korean Patent Application No. 10-2022-0182294, filed on Dec. 22, 2022 in the Korean Intellectual Property Office (KIPO) and International Patent Application No. PCT/KR2022/021717 filed on Jan. 9, 2023, the contents of which are herein incorporated by reference in their entireties.

BACKGROUND

1. Field

Embodiments relate to a method for deforming a shape of a tooth model, an apparatus for deforming the shape of the tooth model and a non-transitory computer-readable storage medium having stored thereon program instructions of the method for deforming the shape of the tooth model. More particularly, embodiments to a method for deforming a shape of a tooth model using a multiple shape deformation method and a mesh blending method, an apparatus for deforming the shape of the tooth model and a non-transitory computer-readable storage medium having stored thereon program instructions of the method for deforming the shape of the tooth model.

2. Description of the Related Art

Among computer-applied three-dimensional modeling methods, a parametric modeling method is a method for creating one complete model by using a mathematically defined feature object. This method may have an advantage of facilitating interaction between a user and a three-dimensional model. For example, in order to create a hexahedron, nodes may be defined, a two-dimensional quadrangle surrounded by a plurality of straight lines may be created, and the quadrangle may be extracted in a normal direction, so that one hexahedron may be completed.

A three-dimensional scan refers to a process of obtaining a mesh data structure having a large number of nodes and a topology thereof by using an optical method, a tactile method, and the like in order to create a three-dimensional object that may be recognized by a computer from an actual object. Currently, the three-dimensional scan is being widely used in various industries. Particularly in the digital dentistry market, since shapes, arrangements, and the like of teeth of users vary for each user, the three-dimensional scan and a result thereof are being widely used to improve productivity.

SUMMARY

Embodiments provide a method for deforming a shape of a tooth model which allows a user to change an overall shape through a simple manipulation using a multiple shape deformation method and a mesh blending method.

Embodiments provide an apparatus for deforming the shape of the tooth model.

2

Embodiments provide a non-transitory computer-readable storage medium having stored thereon program instructions of the method for deforming the shape of the tooth model.

In an example method for deforming a shape of a tooth model according to the present inventive concept, the method includes generating a plurality of deformation shape models by deforming a tooth template model based on tooth scan data and generating a blended shape model by performing mesh blending on the deformation shape models.

In an embodiment, the method may further include receiving a parameter input by a user and deforming the blended shape model based on the parameter.

In an embodiment, a detailed shape of a second deformation shape model among the deformation shape models may be more complex than a detailed shape of a first deformation shape model among the deformation shape models.

In an embodiment, the first deformation shape model may have a side surface that matches a side surface of the tooth scan data, and may have a top surface in which the detailed shape is minimized.

In an embodiment, the second deformation shape model may have a side surface that matches a side surface of the tooth scan data, and may have a top surface having a detailed shape of a top surface of the tooth template model.

In an embodiment, the second deformation shape model may have a side surface that matches a side surface of the tooth scan data, and may have a top surface having a detailed shape of a top surface of the tooth scan data.

In an embodiment, the second deformation shape model may have a side surface that matches a side surface of the tooth scan data, and may have a top surface in which a detailed shape of a top surface of the tooth template model and a detailed shape of a top surface of the tooth scan data are combined.

In an embodiment, the method may further include a parameter input by a user. The parameter may include a first parameter indicating which of the first deformation shape model and the second deformation shape model is closer to the blended shape model and a second parameter indicating which of the detailed shape of the top surface of the tooth template model and the detailed shape of the top surface of the tooth scan data is closer to the detailed shape of the top surface of the second deformation shape model.

In an embodiment, in the generating of the deformation shape models, when a primal problem is f(x), and a dual problem is g(x), $$\arg\min_{x} f(x) \text{ subject to } g(x) = 0$$

may be satisfied.

In an embodiment, a dual problem of a first deformation shape model among the deformation shape models may be identical to a dual problem of a second deformation shape model among the deformation shape models.

In an embodiment, the dual problem of the first deformation shape model and the second deformation shape model may represent a position of a tooth feature point.

In an embodiment, the tooth feature point may include at least one of a buccal cusp, a lingual cusp, a facial occlusal, a lingual occlusal, grooves, a marginal ridge, and a contact.

In an embodiment, when a primal problem of the first deformation shape model is $f_{smooth}(x)$, a primal problem of the second deformation shape model is $f_{preserve}(x)$, and the dual problem of the first deformation shape model and the second deformation shape model is $$g_{feature}(x), \text{arg}\min_{x} f_{smooth}(x) \text{ subject to } g_{feature}(x) = 0 \text{ and}$$

$$\text{arg}\min_{x} f_{preserve}(x) \text{ subject to } g_{feature}(x) = 0$$

may be satisfied.

In an embodiment, a mesh topology of a first deformation shape model among the deformation shape models may be identical to a mesh topology of a second deformation shape model among the deformation shape models.

In an embodiment, when the first deformation shape model is $x_{smooth}$, the second deformation shape model is $x_{preserve}$, a parameter input by a user is param, and the blended shape model is $x_{blended}$, $x_{blended}$=param*$x_{preserve}$+ (1.0–param)*$x_{smooth}$ may be satisfied.

In an example apparatus for deforming a shape of a tooth model according to the present inventive concept, the apparatus includes a deformation shape model generator and a shape blender. The deformation shape model generator generates a plurality of deformation shape models by deforming a tooth template model based on tooth scan data. The shape blender generates a blended shape model by performing mesh blending on the deformation shape models.

In an example non-transitory computer-readable storage medium having stored thereon program instructions, the program instructions is executable by at least one hardware processor to generate a plurality of deformation shape models by deforming a tooth template model based on tooth scan data and generate a blended shape model by performing mesh blending on the deformation shape models.

According to a method for deforming a shape of a tooth model and an apparatus for deforming a shape of a tooth model of the present inventive concept, a plurality of deformation shape models may be generated by deforming a tooth template model based on tooth scan data, and the deformation shape models may be blended by a mesh blending method, so that a final shape model desired by a user may be acquired. In addition, a blended shape can be easily changed through a simple feedback manipulation of the user. Further, a post-processing operation after the shape deformation can be reduced.

The tooth scan data may be captured by a scanner to have a low mesh completion degree, and when the mesh completion degree is relatively low, it may be inappropriate for manufacturing prosthetic appliances, implants, orthodontic appliances, and the like through 3D printing. Conversely, the tooth template model may be a tooth model with a relatively high mesh completion degree. Therefore, when the prosthetic appliances, the implants, orthodontic the appliances, and the like are manufactured by deforming the tooth template model, it may be very appropriate to use a 3D printing scheme.

As described above, when shape deformation is performed to allow the tooth template model to be closer to the tooth scan data, manufacturing times of the prosthetic appliances, the implants, the orthodontic appliances, and the like can be reduced, manufacturing processes of the prosthetic appliances, the implants, the orthodontic appliances, and the like can be shortened, and quality of the prosthetic appliances, the implants, the orthodontic appliances, and the like can be improved.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE EMBODIMENTS

Figure 1:
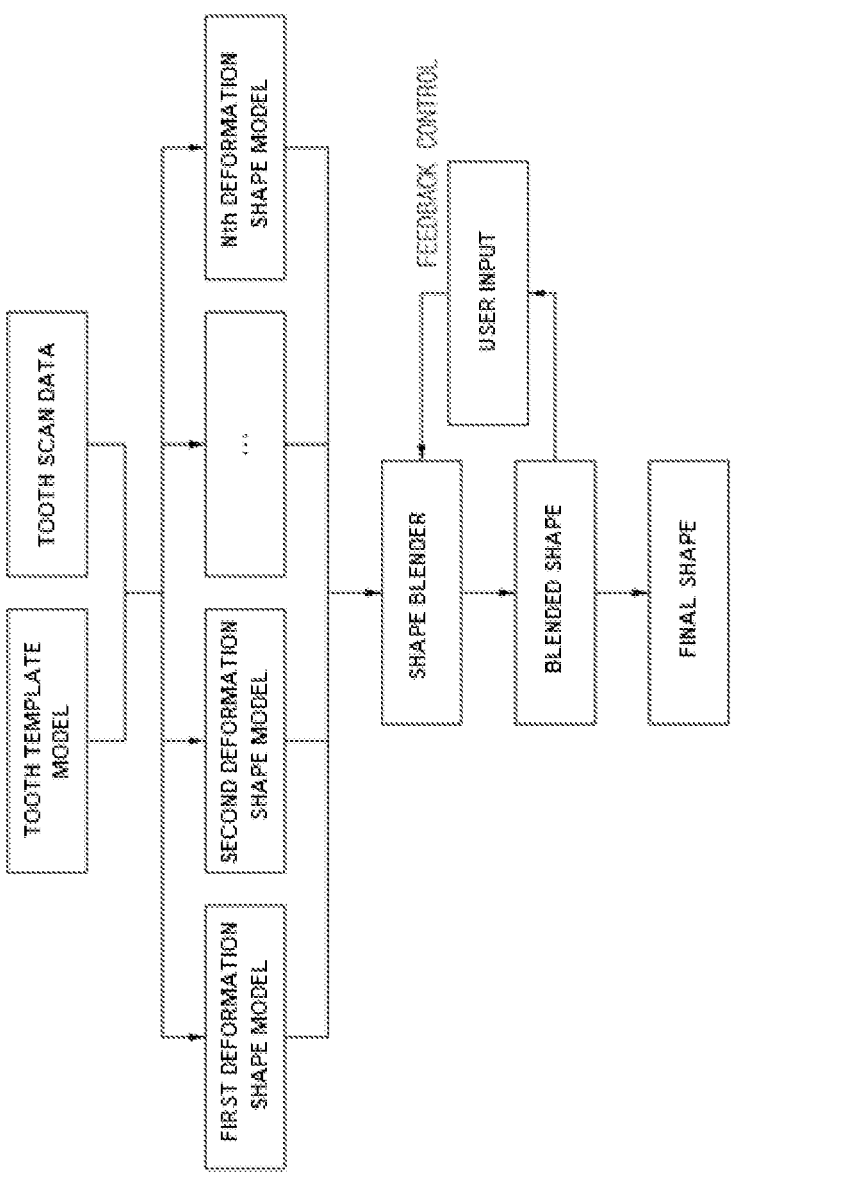
FIG. 1 is a flowchart showing a method for deforming a shape of a tooth model according to one embodiment of the present inventive concept.

The present inventive concept now will be described more fully hereinafter with reference to the accompanying drawings, in which embodiments of the present invention are shown. The present inventive concept may, however, be embodied in many different forms and should not be construed as limited to the embodiments set forth herein.

Rather, these embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a flowchart showing a method for deforming a shape of a tooth model according to one embodiment of the present inventive concept.

Referring to FIG. 1, a method for deforming a shape of a tooth model may include generating a plurality of deformation shape models by deforming a tooth template model based on tooth scan data and generating a blended shape model by performing mesh blending on the deformation shape models. The method for deforming the shape of the tooth model may further include receiving a parameter input by a user and deforming the blended shape model based on the parameter.

The method for deforming the shape of the tooth model of the present inventive concept may be operated by a computing apparatus.

For example, the tooth scan data may be a three dimensional ("3D") tooth scan data. The tooth scan data refers to a scanned data of teeth and oral cavity by a 3D scanner, or a scanned data of an impression object or a reconstructed object of the teeth and the oral cavity by the 3D scanner. In prosthetic treatment such as in-ray, on-ray, and crown, dental treatment such as implant and orthodontic treatment, oral data of the patient may be acquired and be used to design prosthesis or implant, and to manufacture braces.

For example, the tooth scan data may be a mesh data including 3D vertices and triangles or quadrangles generated by connecting the vertices. A file extension of the tooth scan data may not be limited. For example, the file extension of the tooth scan data may be one of ply, obj and stl.

In this case, the tooth scan data is not limited to scan data including only a tooth, and the tooth scan data may further include other body regions in addition to the tooth.

The tooth template model may be a kind of a sample tooth (standard tooth) used to manufacture prosthetic appliances, implants, orthodontic appliances, and the like, and may have a typical tooth shape. The tooth template model may have one sample tooth (standard tooth) for each tooth number.

The tooth scan data may be captured by a scanner to have a low mesh completion degree to some extent, and when the mesh completion degree is low, it may be inappropriate for manufacturing the prosthetic appliances, the implants, the orthodontic appliances, and the like through 3D printing. Conversely, the tooth template model may be a tooth model with a relatively high mesh completion degree. Therefore, when the prosthetic appliances, the implants, the orthodontic appliances, and the like are manufactured by modifying the template model, it may be very appropriate to use a 3D printing scheme.

A shape deformation (mesh deformation) method may refer to a method capable of interacting with several nodes of general mesh data including a large number of nodes to move the remaining nodes. Shape deformation-based registration (deformable registration) may refer to a method for deforming an input model into another target model through shape deformation and matching between nodes.

In addition, a shape blending (mesh blending) method may be a method for creating one new model by mixing two shapes having the same structure with each other.

According to the present inventive concept, when shape deformation based on a dental template model is performed on input tooth scan data, as shown in FIG. 1, a plurality of deformation shapes may be internally calculated to allow the user to easily handle and obtain a blended shape. For example, the deformation shape models may include N deformation shape models. As shown in FIG. 1, the deformation shape models may include a first deformation shape model, a second deformation shape model, . . . , and an $N^{th}$ deformation shape model.

Figure 2A:
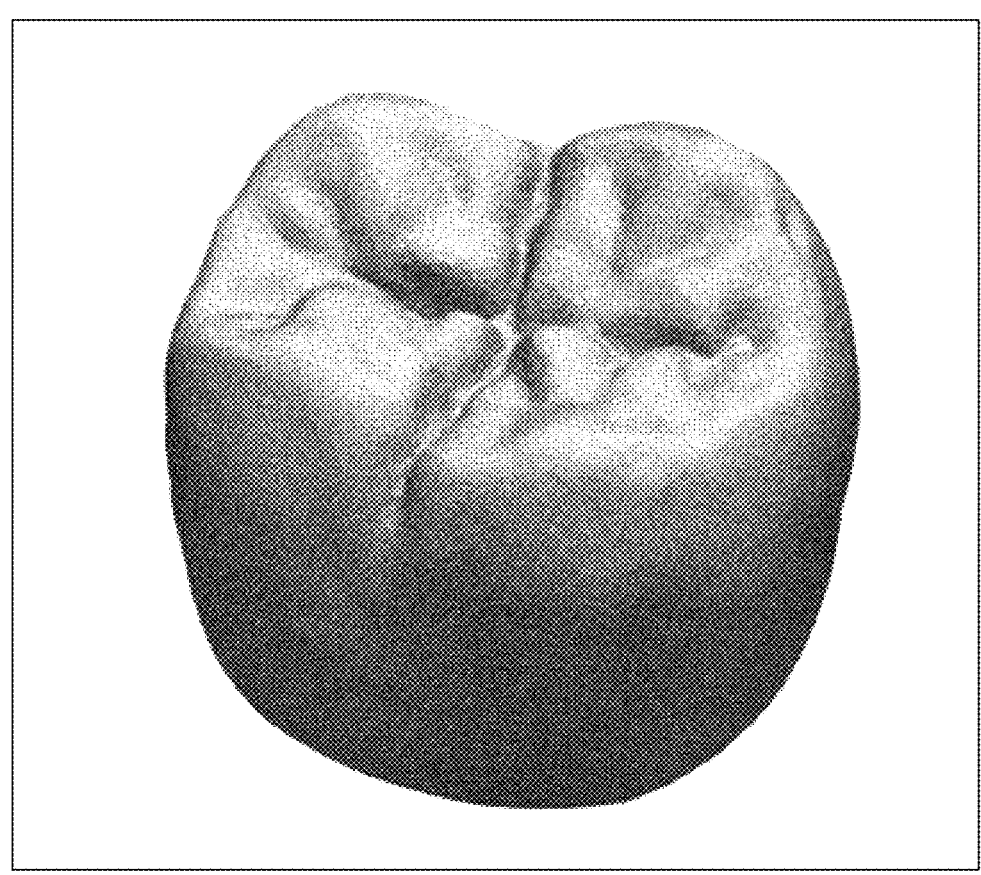
FIG. 2A is a view showing one example of a tooth template model.
Figure 2B:
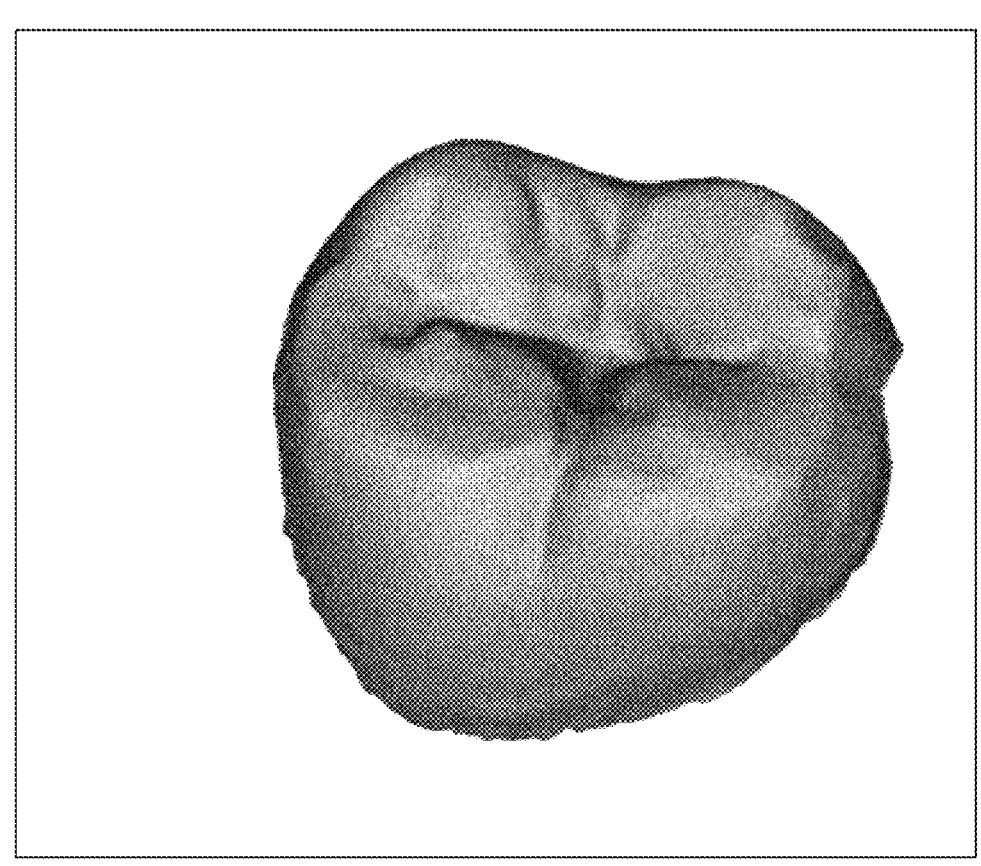
FIG. 2B is a view showing one example of tooth scan data.
Figure 2C:
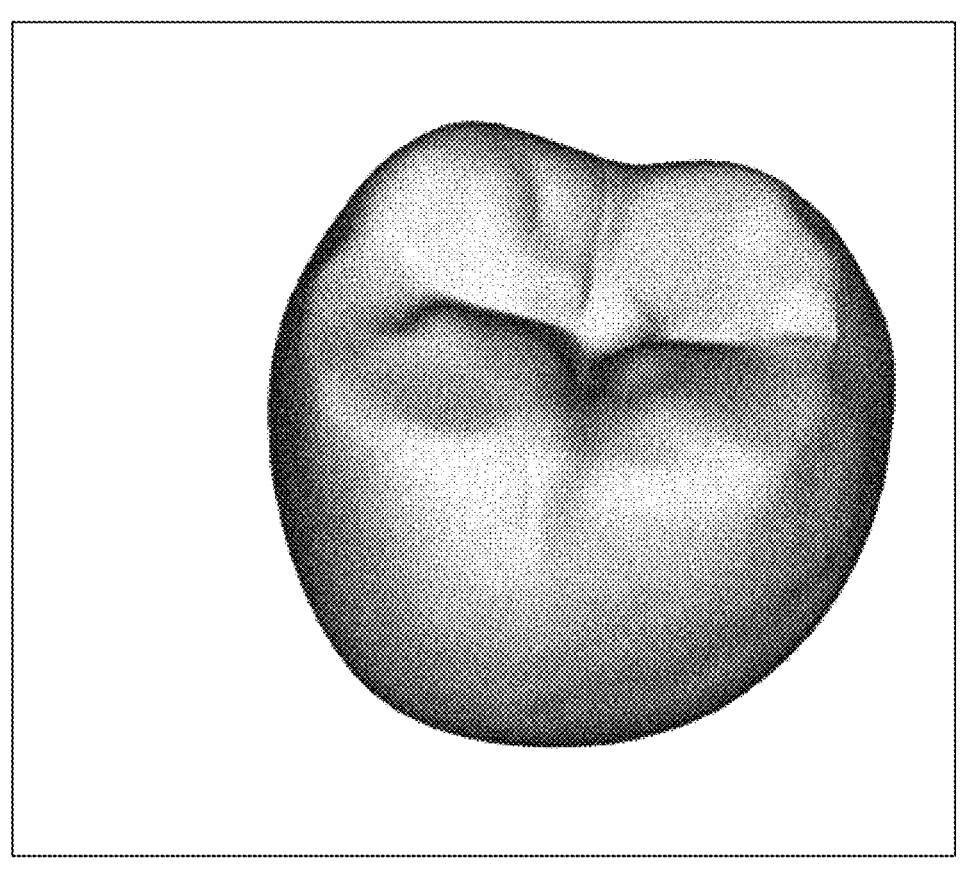
FIG. 2C is a view showing one example of a deformation shape model obtained by deforming the tooth template model of FIG. 2A based on the tooth scan data of FIG. 2B.
Figure 2D:
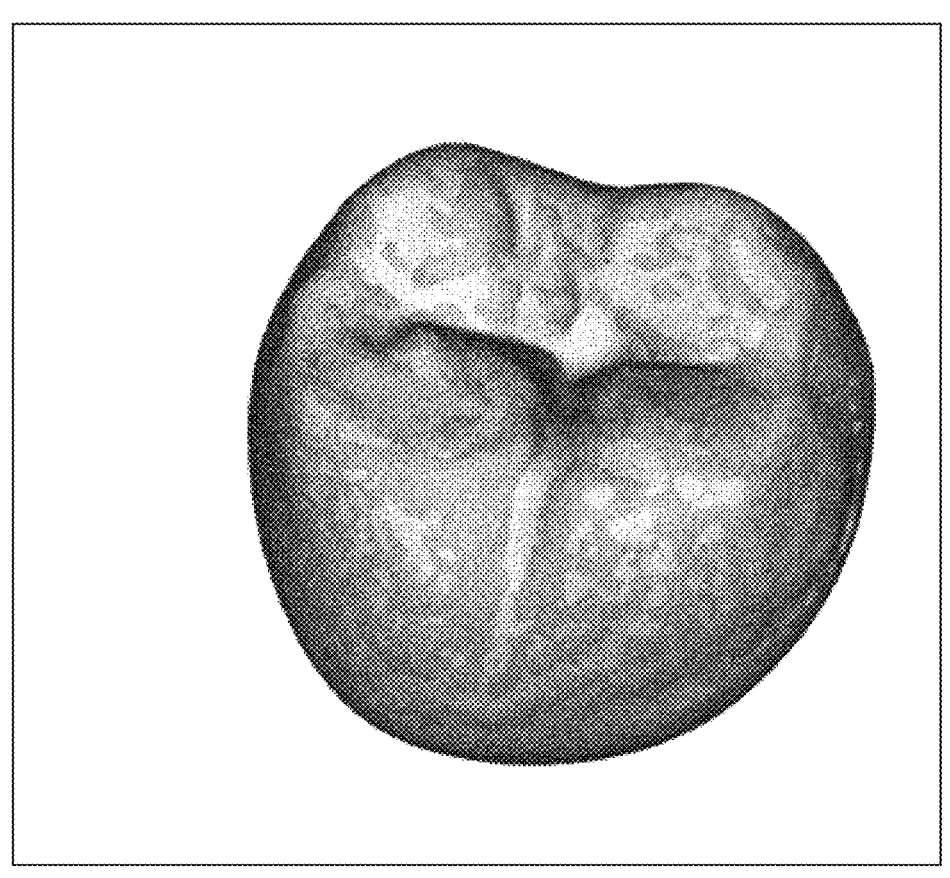
FIG. 2D is a view for simultaneously visualizing the deformation shape model of FIG. 2C and the tooth scan data of FIG. 2B.

FIG. 2A is a view showing one example of a tooth template model. FIG. 2B is a view showing one example of tooth scan data. FIG. 2C is a view showing one example of a deformation shape model obtained by deforming the tooth template model of FIG. 2A based on the tooth scan data of FIG. 2B. FIG. 2D is a view for simultaneously visualizing the deformation shape model of FIG. 2C and the tooth scan data of FIG. 2B.

Referring to FIGS. 1 to 2D, FIG. 2A shows one example of a tooth template model, FIG. 2B shows one example of tooth scan data, and FIG. 2C shows one example of a deformation shape model obtained by deforming the tooth template model of FIG. 2A based on the tooth scan data of FIG. 2B.

In FIG. 2C, the deformation shape model may be obtained by deforming the tooth template model to have a shape of the tooth scan data. As shown in FIG. 2D, the deformation shape model generated by deforming the tooth template model may have a shape that is extremely similar to the shape of the tooth scan data.

Since the deformation shape model does not necessarily have to have the same shape as the tooth scan data, the deformation shape model may be deformed in various deformation schemes.

Figure 3A:
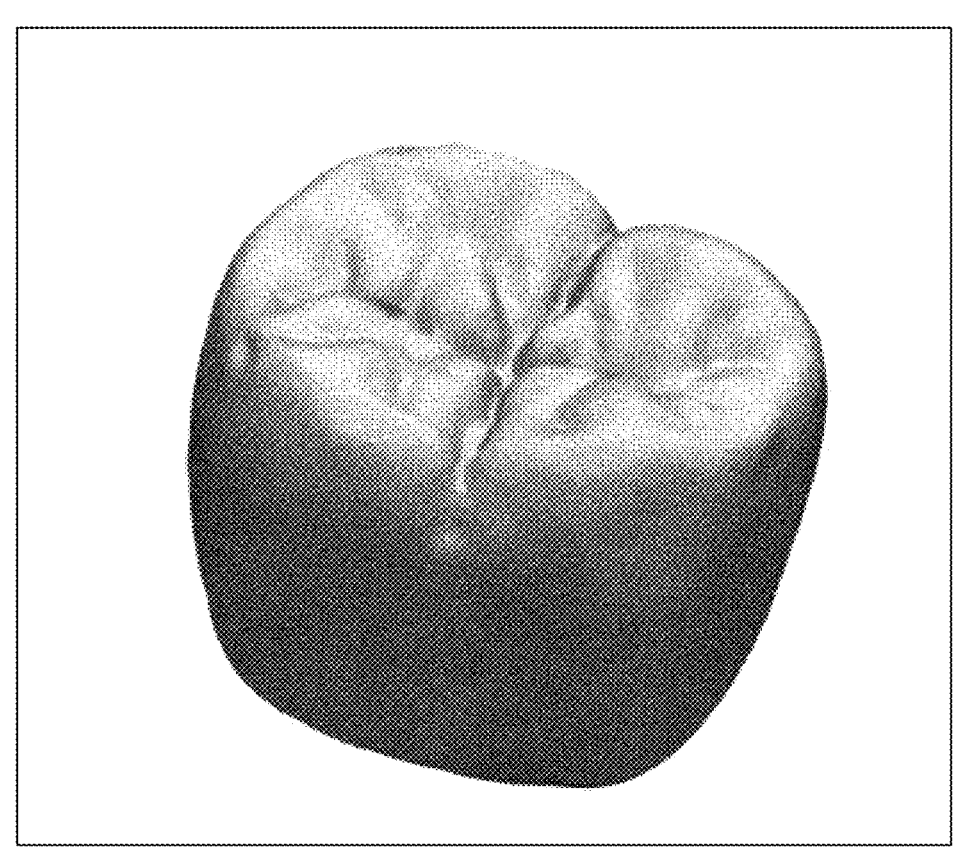
FIG. 3A is a view showing one example of a tooth template model.
Figure 3B:
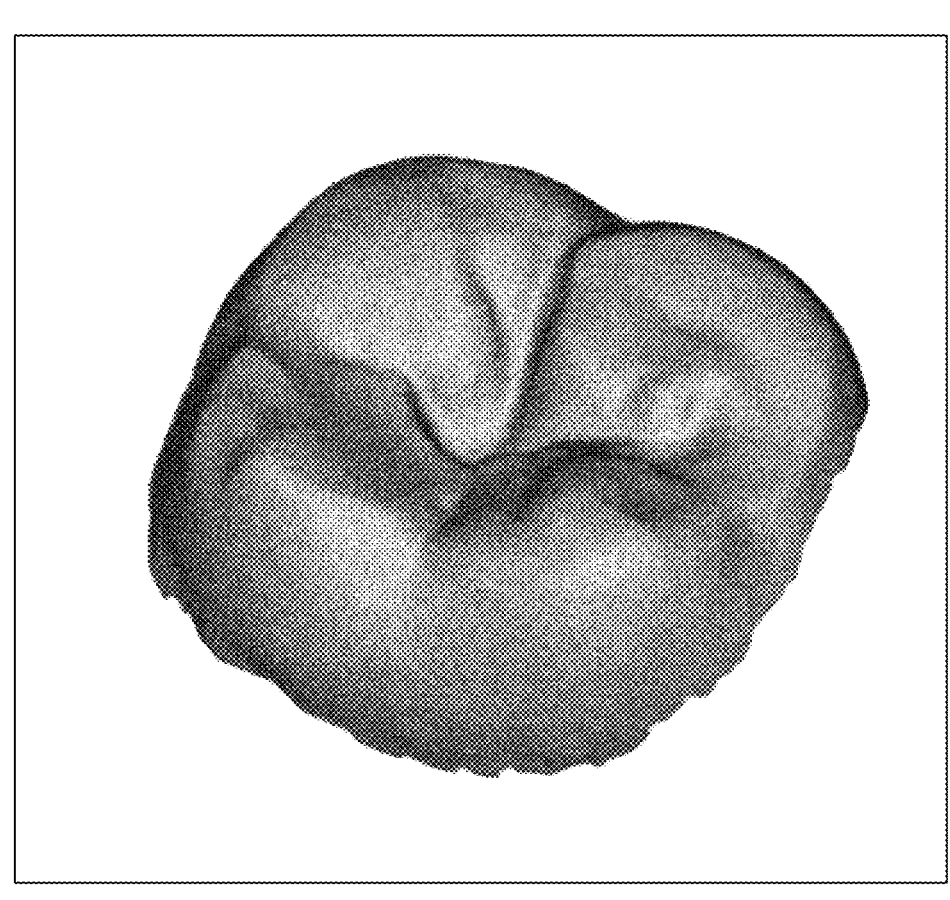
FIG. 3B is a view showing one example of tooth scan data.
Figure 3C:
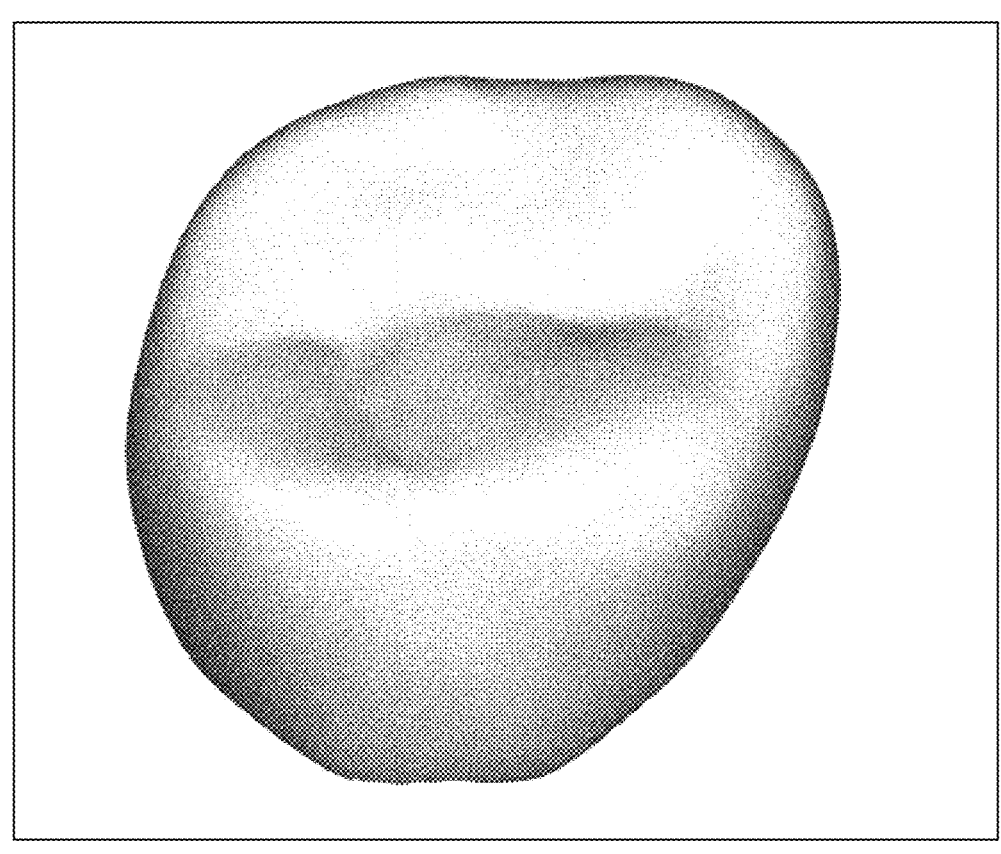
FIG. 3C is a view showing a first deformation shape model obtained by deforming the tooth template model of FIG. 3A based on the tooth scan data of FIG. 3B.
Figure 3D:
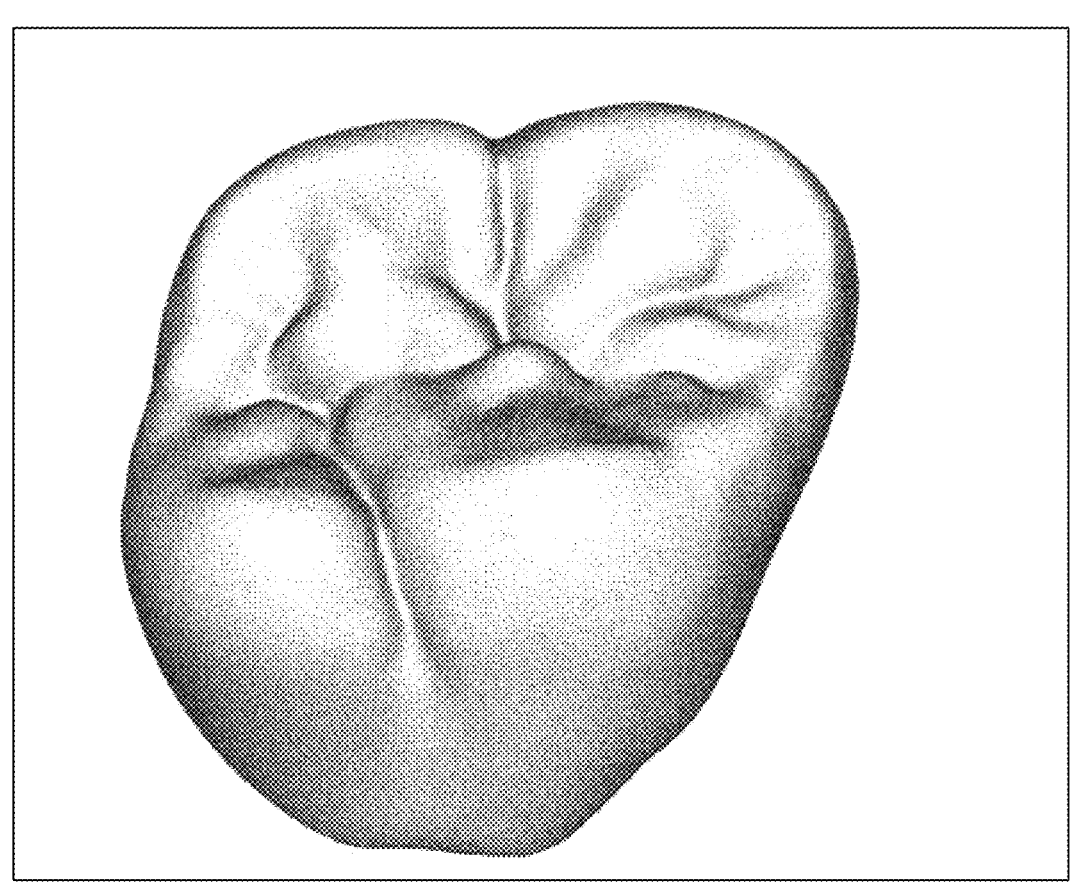
FIG. 3D is a view showing a second deformation shape model obtained by deforming the tooth template model of FIG. 3A based on the tooth scan data of FIG. 3B.

FIG. 3A is a view showing one example of a tooth template model. FIG. 3B is a view showing one example of tooth scan data. FIG. 3C is a view showing a first deformation shape model obtained by deforming the tooth template model of FIG. 3A based on the tooth scan data of FIG. 3B. FIG. 3D is a view showing a second deformation shape model obtained by deforming the tooth template model of FIG. 3A based on the tooth scan data of FIG. 3B.

Referring to FIGS. 1 to 3D, FIG. 3A shows one example of a tooth template model, FIG. 3B shows one example of tooth scan data, FIG. 3C shows a first deformation shape model obtained by deforming the tooth template model of FIG. 3A based on the tooth scan data of FIG. 3B, and FIG. 3D shows a second deformation shape model obtained by deforming the tooth template model of FIG. 3A based on the tooth scan data of FIG. 3B.

According to the present embodiment, a plurality of deformation shape models may be generated by deforming a tooth template model based on tooth scan data. For example, the first deformation shape model may be a shape model in which a detailed shape is minimized, and the second deformation shape model may be a shape model in which a detailed shape is maximized.

The user may select a blended shape model having an appropriate level desired by the user between the first deformation shape model in which the detailed shape is minimized and the second deformation shape model in which the detailed shape is maximized. The user may select the blended shape model desired by the user through initial settings, and even after the blended shape model is primarily formed, the blended shape model may be deformed through a feedback input.

For example, the user may generate a shape model having a detailed shape that is closest to a target model in order to form a prosthetic appliance or the like. Alternatively, a shape model having a minimized detailed shape may be generated for ease of a modification operation or the like.

As shown in FIGS. 3C and 3D, the detailed shape of the second deformation shape model among the deformation shape models may be more complex than the detailed shape of the first deformation shape model among the deformation shape models.

As shown in FIG. 3C, the first deformation shape model may have a side surface that matches a side surface of the tooth scan data, and may have a top surface in which the detailed shape is minimized.

As shown in FIG. 3D, the second deformation shape model may have a side surface that matches a side surface of the tooth scan data, and may have a top surface having a detailed shape of a top surface of the tooth template model.

In contrast, the second deformation shape model may have a side surface that matches a side surface of the tooth scan data, and may have a top surface having a detailed shape of a top surface of the scan data.

In contrast, the second deformation shape model may have a side surface that matches a side surface of the tooth scan data, and may have a top surface in which a detailed shape of a top surface of the tooth template model and a detailed shape of a top surface of the tooth scan data are combined.

Figure 4:
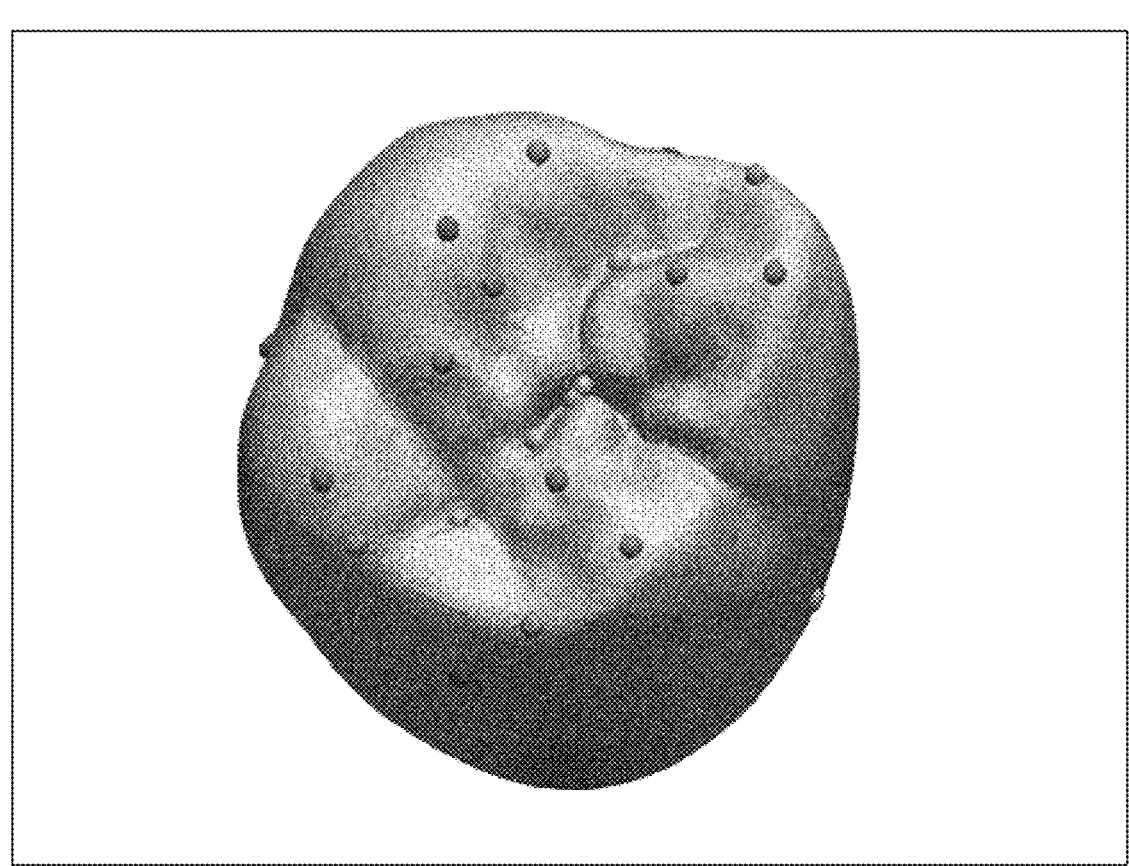
FIG. 4 is a view showing examples of feature points of a tooth.
Figure 5:
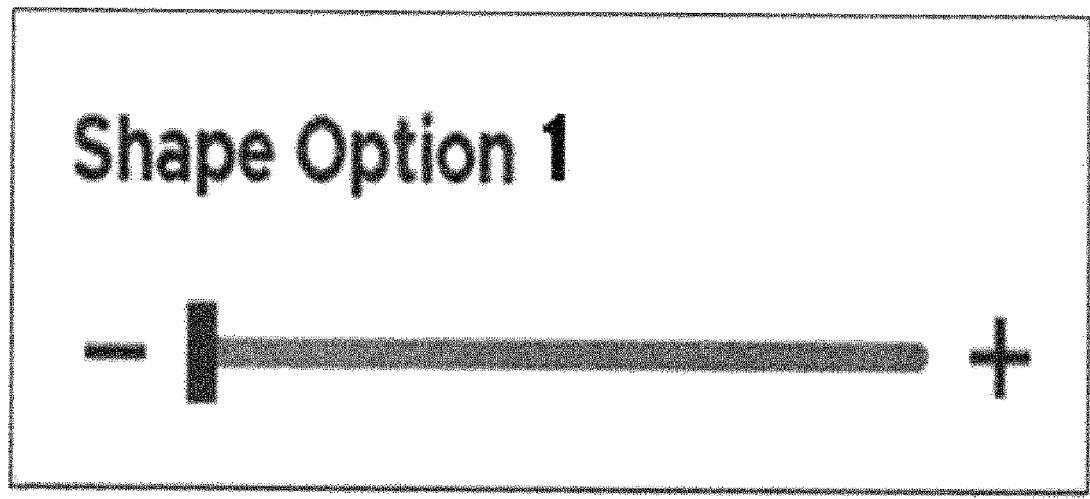
FIG. 5 is a view showing one example of a user interface of a user input step of FIG. 1.
Figure 6:
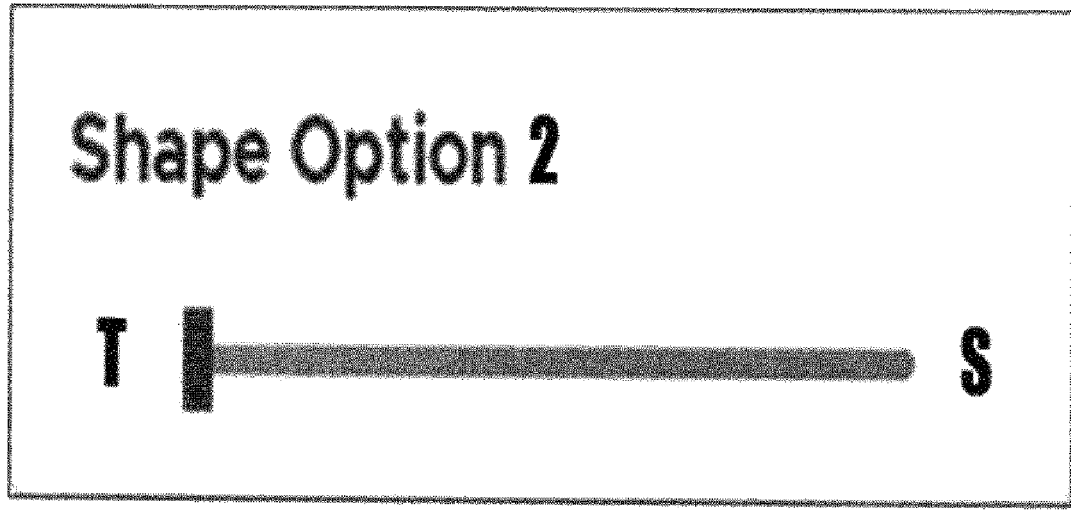
FIG. 6 is a view showing one example of a user interface of the user input step of FIG. 1.

FIG. 4 is a view showing examples of feature points of a tooth. FIG. 5 is a view showing one example of a user interface of a user input step of FIG. 1. FIG. 6 is a view showing one example of a user interface of the user input step of FIG. 1.

Referring to FIGS. 1 to 6, the method for deforming the shape may be performed by using an optimization problem as in Formula 1.

$$\arg \min_{x} f(x) \text{ subject to } g(x) = 0 \qquad \text{[Formula 1]}$$

A solution to the optimization problem may be considered as a main principle that determines a position of each vertex. Due to a definition and an implementation principle of the optimization problem, mutually different shapes having the same topology may be obtained as shown in FIGS. 3C and 3D even when the same data is used. In detail, the optimization problem may be divided into a primal (f(x)) problem and a dual (g(x)) problem. The primal problem may be uniformly applied to all vertices of a mesh model, and may provide an overall shape adjustment principle. The dual problem may allow the mesh model to be directly adjusted.

As shown in FIG. 4, the tooth model may have feature points that are considered important upon anatomical analysis and design of a shape of a dental prosthetic appliance in a dental field. Positions of the feature points may be designated through prediction through deep learning, matching with a reference model, extraction of feature points from a reference model, or the like. The feature points having the designated positions may be set as the dual problem of the optimization problem described above.

In this case, the primal problem may be set to smooth an overall shape (FIG. 3C), or to preserve partial features of an original template shape (FIG. 3D). Therefore, in mutually different primal problems, two optimization problems with mutually different expected results may be set to share the same dual problem as in Formulas 2 and 3. When the shape is deformed to a position of a vertex obtained by solving the optimization problem, mutually different results may be obtained as shown in FIGS. 3C and 3D.

For example, a dual problem of a first deformation shape model among the deformation shape models may be identical to a dual problem of a second deformation shape model among the deformation shape models. For example, the dual problem of the first deformation shape model and the second deformation shape model may represent a position of a tooth feature point (FIG. 4). For example, the tooth feature point may be at least one of a buccal cusp, a lingual cusp, a facial occlusal, a lingual occlusal, grooves, a marginal ridge, and a contact.

When a primal problem of the first deformation shape model is $f_{smooth}(x)$, a primal problem of the second deformation shape model is $f_{preserve}(x)$, and the dual problem of the first deformation shape model and the second deformation shape model is $g_{feature}(x)$, the following Formulas 2 and 3 may be satisfied.

$$\arg \min_{x} f_{smooth}(x) \text{ subject to } g_{feature}(x) = 0 \qquad \text{[Formula 2]}$$

$$\arg \min_{x} f_{preserve}(x) \text{ subject to } g_{feature}(x) = 0 \qquad \text{[Formula 3]}$$

Previously, results of mutually different detailed shapes having the same topology between vertices have been obtained. However, it may be difficult to conclude that both shapes are shapes desired by the user. The user may determine that the detailed shape of the template model has been preserved too strongly, or may think that too much smoothing has been done to the shape. In order to obtain a result desired by the user, the user may desire to determine an intermediate result between the results of the shapes while easily performing adjustment through feedback control on the parameter. Therefore, a parameter adjustment UI as shown in FIG. 5 may be provided to the user to enable immediate and fast feedback control through the parameter adjustment UI. Since two meshes (the first deformation shape model and the second deformation shape model) have the same topology as described above, a blended shape may be calculated for each vertex by using the following linear interpolation (LERP) formula (Formula 4).

$$x_{blended} = param * x_{preserve} + (1.0 - param) * x_{smooth} \qquad \text{[Formula 4]}$$

In this case, the first deformation shape model may be $x_{smooth}$, the second deformation shape model may be $x_{preserve}$, the parameter input by the user may be param, and the blended shape model may be $x_{blended}$.

The parameter provided in FIG. 5 may be considered as a param value provided in Formula 4. The parameter may indicate which of the first deformation shape model and the second deformation shape model is closer to the blended shape model.

As the mesh blending method, various other schemes may be applied according to a principle of multiple shape deformation and the like, such as spherical linear interpolation (SLERP) and interpolation between different topology meshes, as well as LERP.

As described above, the detailed shape of the upper surface of the second deformation shape model may have an upper surface that is a combination of the detailed shape of the upper surface of the tooth template model and the detailed shape of the upper surface of the tooth scan data.

In this case, as shown in FIG. 6, the parameter input by the user may further include a second parameter indicating which of the detailed shape of the top surface of the tooth template model and the detailed shape of the top surface of the tooth scan data is closer to the detailed shape of the top surface of the second deformation shape model.

For example, for generation of a prosthetic appliance or the like, it may be advantageous to have a shape that is close to the detailed shape of the tooth template model.

Meanwhile, for use as artificial intelligence learning data or the like, it may be advantageous to have a shape that is close to the detailed shape of the tooth scan data, which is a shape of an actual natural tooth.

FIGS. 7A to 7D and FIGS. 8A to 8D are views showing examples of blended shapes according to user parameters.

In this case, the first deformation shape model may be a shape model in which a detailed shape is minimized, the second deformation shape model may be a shape model in which a detailed shape is maximized, and the parameter may indicate which of the first deformation shape model and the second deformation shape model is closer to the blended shape model.

Figure 7A:
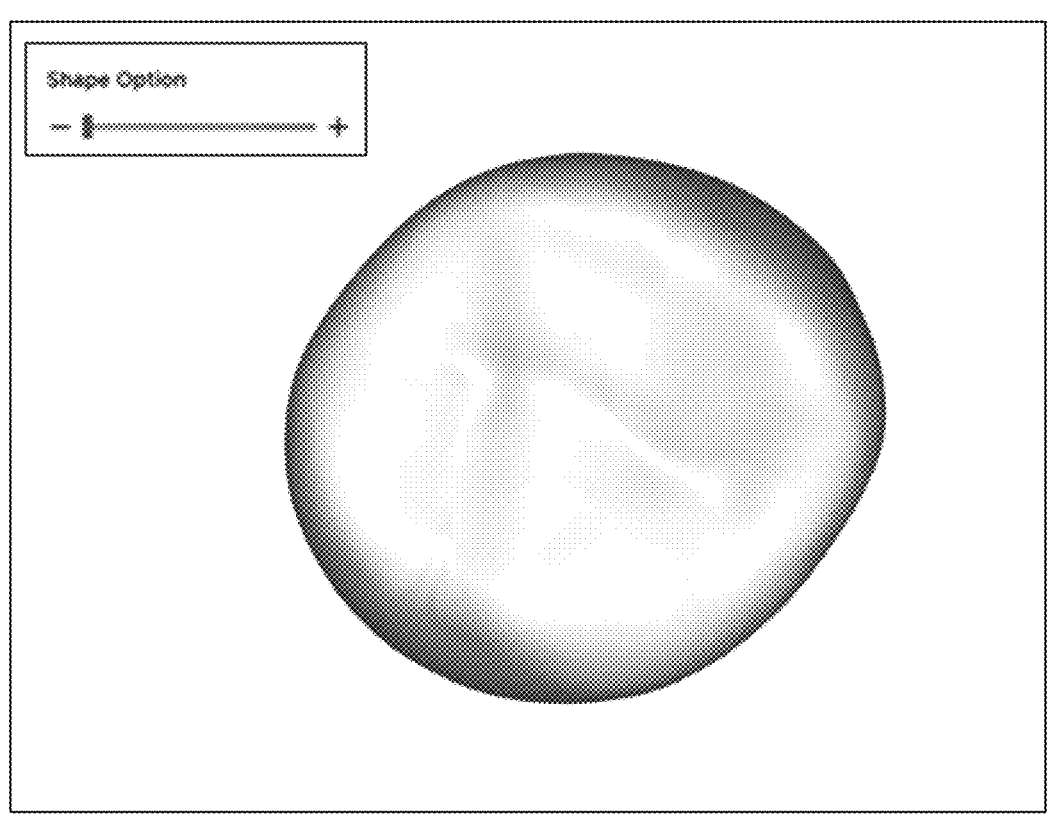
FIGS. 7A to 7D and FIGS. 8A to 8D are views showing examples of blended shapes according to user parameters.
Figure 8A:
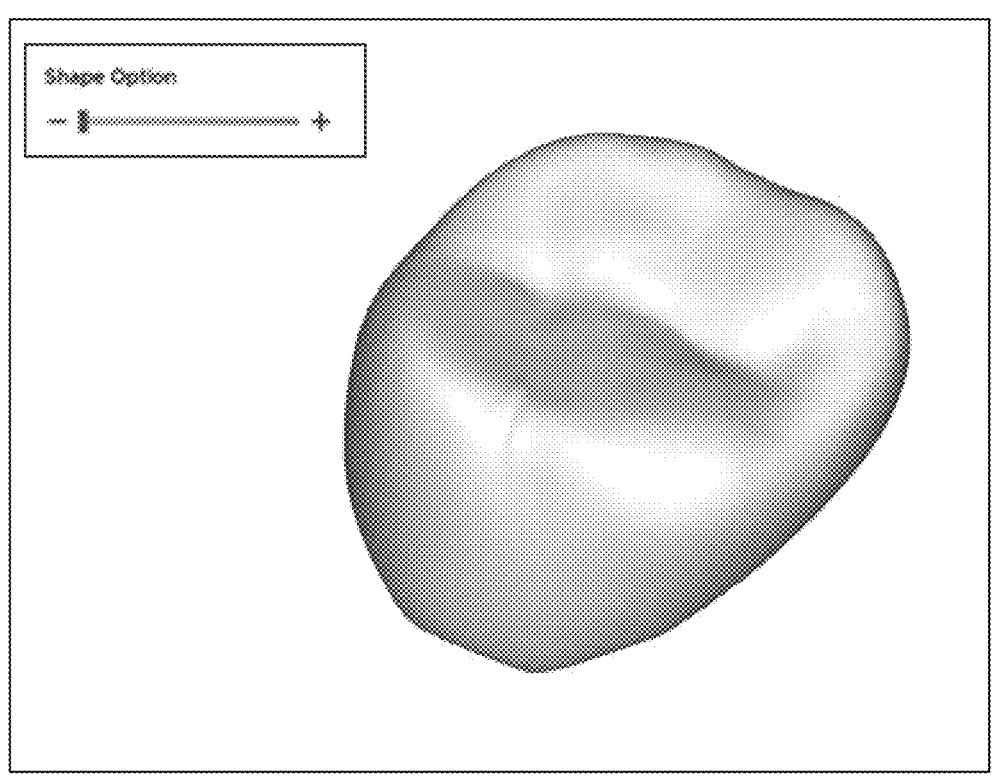

FIGS. 7A and 8A may correspond to a case in which the parameter has a minimum value (e.g., 0), and the blended shape may be identical to the first deformation shape model. In other words, the blended shape may be a shape model in which a detailed shape is minimized.

Figure 7B:
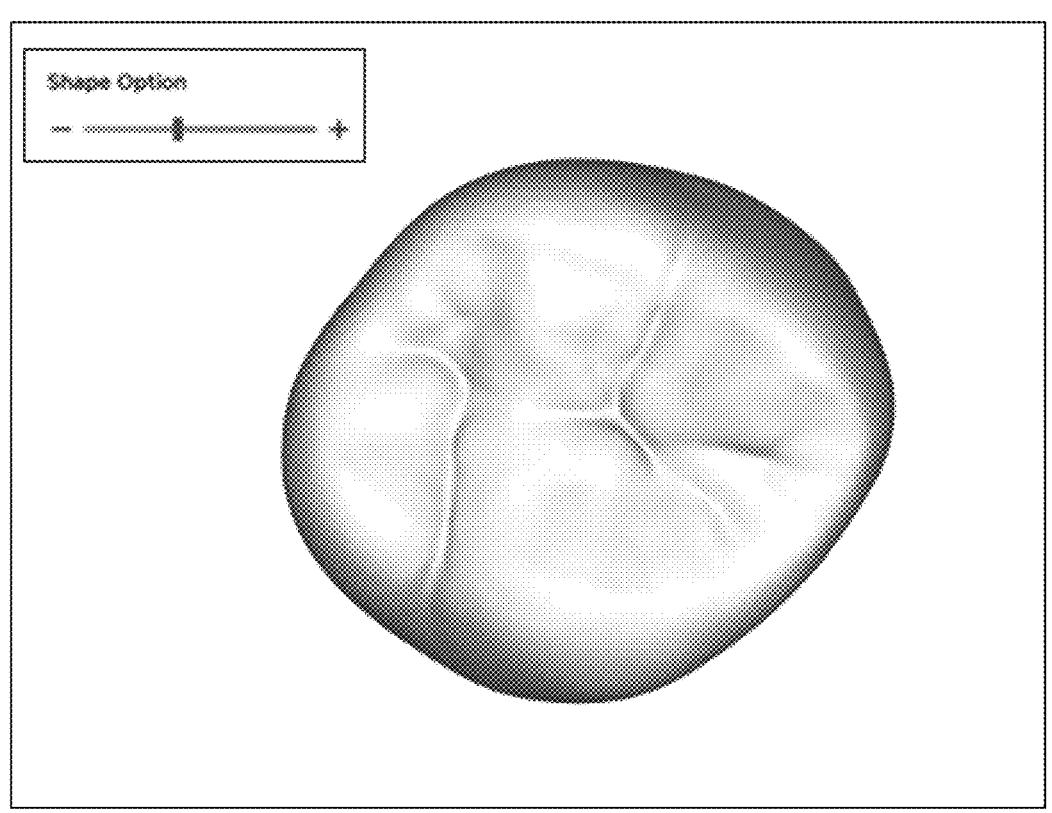
Figure 7C:
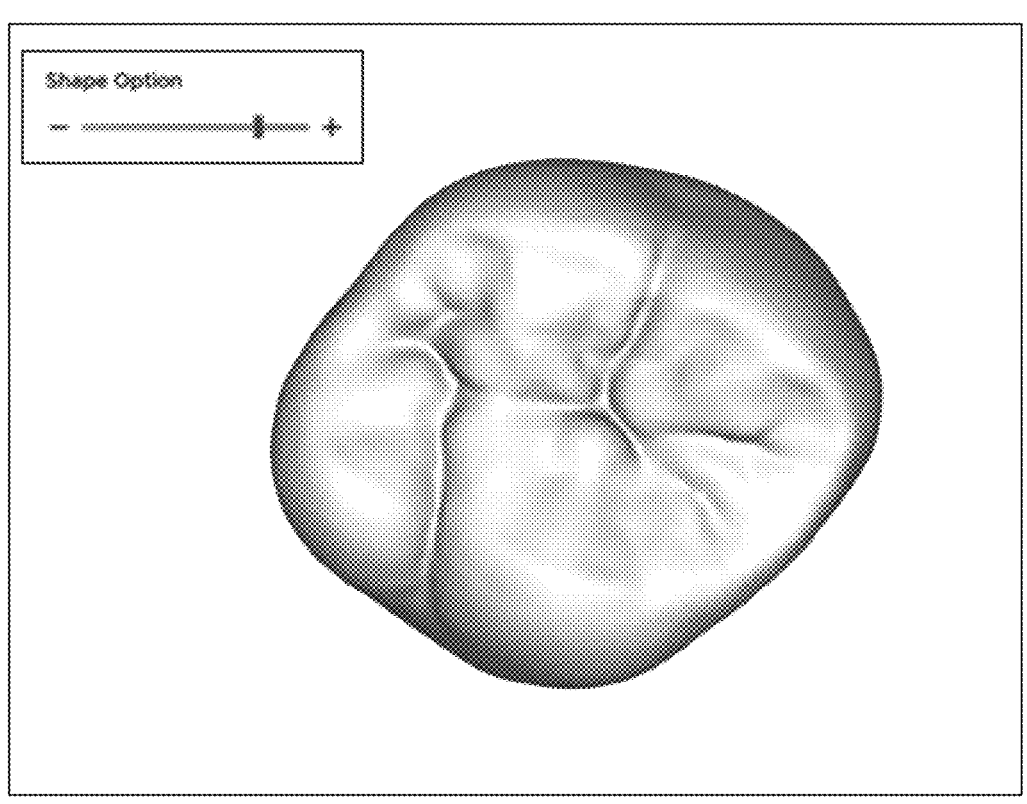
Figure 7D:
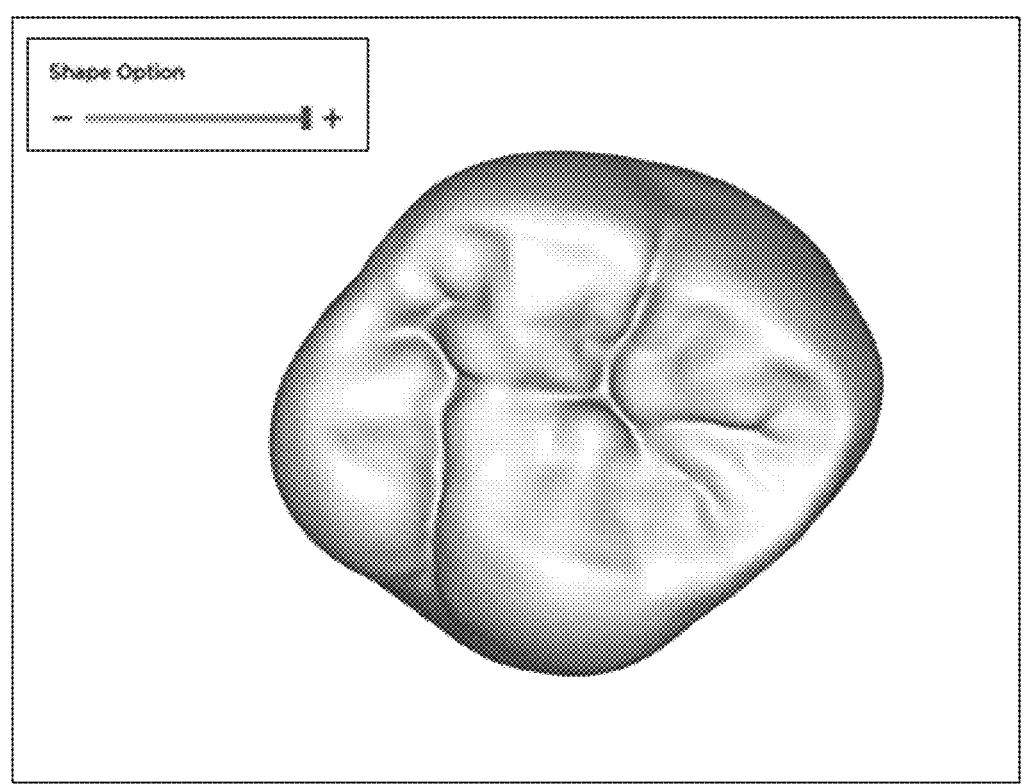
Figure 8B:
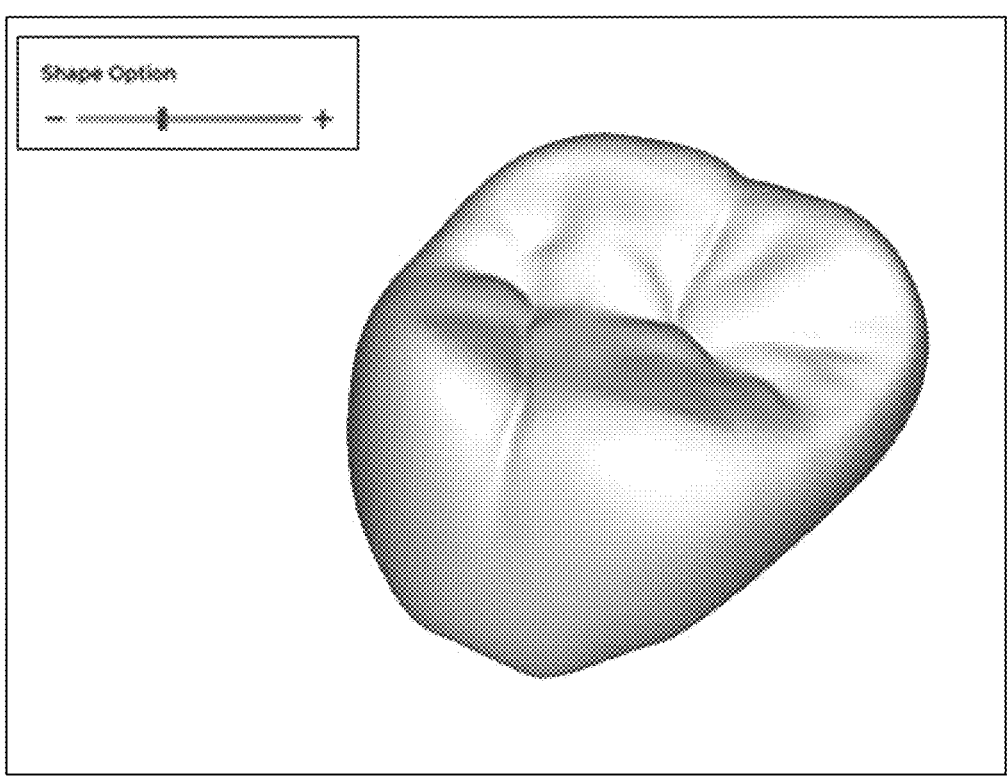
Figure 8C:
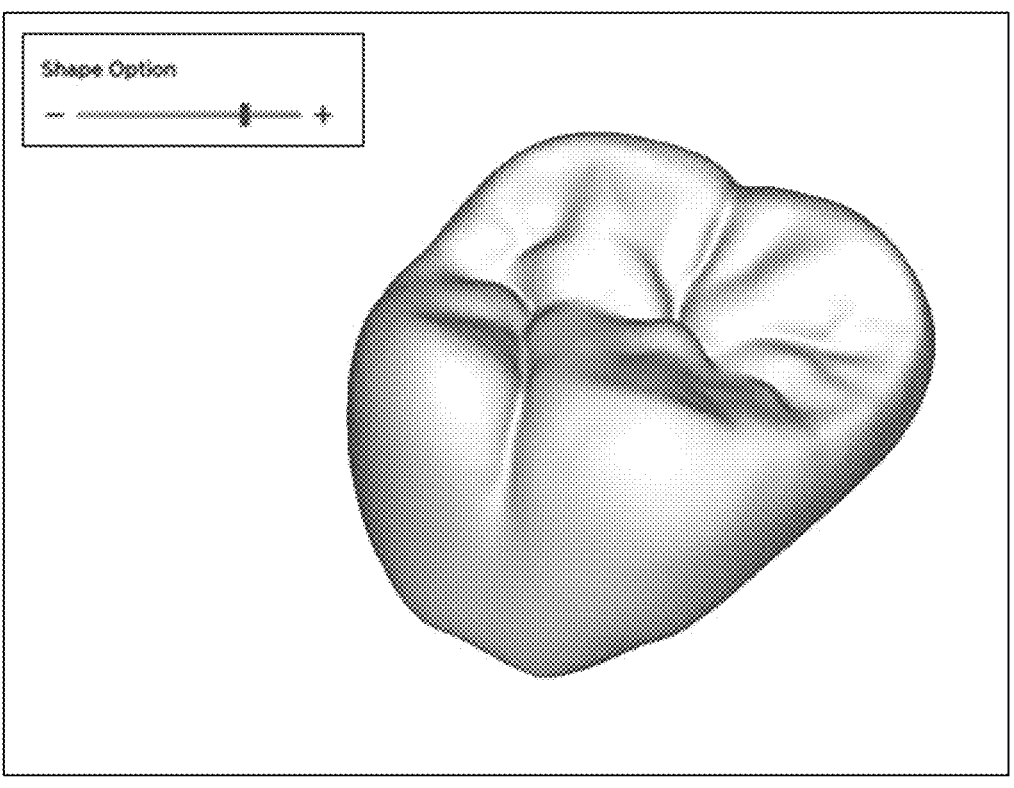
Figure 8D:
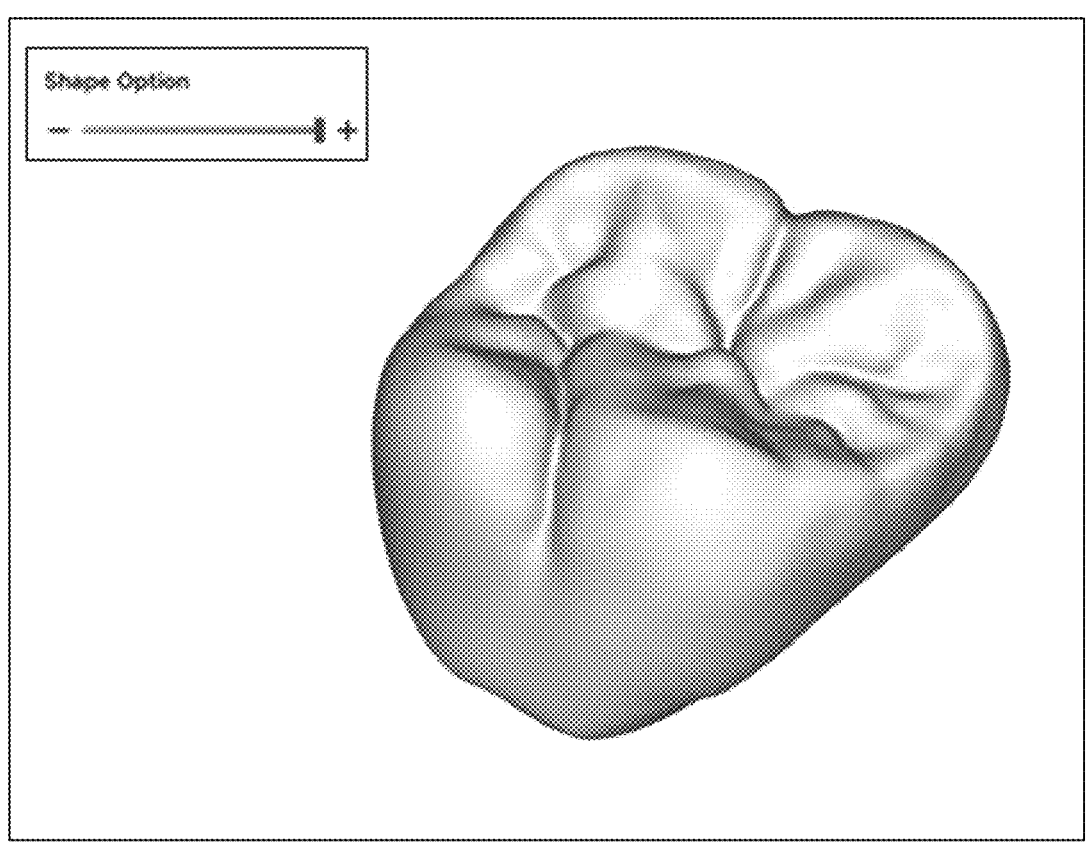

FIGS. 7D and 8D may correspond to a case in which the parameter has a maximum value (e.g., 1), and the blended shape may be identical to the second deformation shape model. In other words, the blended shape may be a shape model in which a detailed shape is maximized.

FIGS. 7B and 8B may illustrate a case in which the blended shape has a shape that is closer to the first deformation shape model among the first deformation shape model and the second deformation shape model.

FIGS. 7C and 8C may illustrate a case in which the blended shape has a shape that is closer to the second deformation shape model among the first deformation shape model and the second deformation shape model.

According to the present embodiment, a plurality of deformation shape models may be generated by deforming a tooth template model based on tooth scan data, and the deformation shape models may be blended by a mesh blending method, so that a final shape model desired by a user may be acquired. In addition, a blended shape can be easily changed through a simple feedback manipulation of the user. Further, a post-processing operation after the shape deformation can be reduced.

The tooth scan data may be captured by a scanner to have a low mesh completion degree, and when the mesh completion degree is relatively low, it may be inappropriate for manufacturing prosthetic appliances, implants, orthodontic appliances, and the like through 3D printing. Conversely, the tooth template model may be a tooth model with a relatively high mesh completion degree. Therefore, when the prosthetic appliances, the implants, orthodontic the appliances, and the like are manufactured by deforming the tooth template model, it may be very appropriate to use a 3D printing scheme.

As described above, when shape deformation is performed to allow the tooth template model to be closer to the tooth scan data, manufacturing times of the prosthetic appliances, the implants, the orthodontic appliances, and the like can be reduced, manufacturing processes of the prosthetic appliances, the implants, the orthodontic appliances, and the like can be shortened, and quality of the prosthetic appliances, the implants, the orthodontic appliances, and the like can be improved.

According to an embodiment of the present inventive concept, a non-transitory computer-readable storage medium having stored thereon program instructions of the method for deforming the shape of the tooth model may be provided. The above mentioned method may be written as a program executed on the computer. The method may be implemented in a general purpose digital computer which operates the program using a computer-readable medium. In addition, the structure of the data used in the above mentioned method may be written on a computer readable medium through various means. The computer readable medium may include program instructions, data files and data structures alone or in combination. The program instructions written on the medium may be specially designed and configured for the present inventive concept, or may be generally known to a person skilled in the computer software field. For example, the computer readable medium may include a magnetic medium such as a hard disk, a floppy disk and a magnetic tape, an optical recording medium such as CD-ROM and DVD, a magneto-optical medium such as floptic disc and a hardware device specially configured to store and execute the program instructions such as ROM, RAM and a flash memory. For example, the program instructions may include a machine language codes produced by a compiler and high-level language codes which may be executed by a computer using an interpreter or the like. The hardware device may be configured to operate as one or more software modules to perform the operations of the present inventive concept.

In addition, the above mentioned method for deforming the shape of the tooth model may be implemented in a form of a computer-executed computer program or an application which are stored in a storage method.

The present inventive concept is related to the method for deforming the shape of the tooth model, the apparatus for deforming the shape of the tooth model and the non-transitory computer-readable storage medium having stored thereon program instructions of the method for deforming the shape of the tooth model. According to the present inventive concept, the manufacturing times of the prosthetic appliances, the implants, the orthodontic appliances, and the like can be reduced, the manufacturing processes of the prosthetic appliances, the implants, the orthodontic appliances, and the like can be shortened, and the quality of the prosthetic appliances, the implants, the orthodontic appliances, and the like can be improved.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A method for deforming a shape of a tooth model, the method comprising:
   generating a plurality of deformation shape models by deforming a tooth template model based on tooth scan data; and
   generating a blended shape model by performing mesh blending on the deformation shape models;
   wherein a detailed shape of a second deformation shape model among the deformation shape models is more complex than a detailed shape of a first deformation shape model among the deformation shape models, and
   wherein the first deformation shape model has a side surface that matches a side surface of the tooth scan data, and has a top surface in which the detailed shape is minimized.

2. The method of claim 1, further comprising:
   receiving a parameter input by a user; and
   deforming the blended shape model based on the parameter.

3. The method of claim 1, wherein the second deformation shape model has a side surface that matches the side surface of the tooth scan data, and has a top surface having a detailed shape of a top surface of the tooth template model.

4. The method of claim 1, wherein the second deformation shape model has a side surface that matches the side surface of the tooth scan data, and has a top surface having a detailed shape of a top surface of the tooth scan data.

5. The method of claim 1, wherein the second deformation shape model has a side surface that matches the side surface of the tooth scan data, and has a top surface in which a detailed shape of a top surface of the tooth template model and a detailed shape of a top surface of the tooth scan data are combined.

6. The method of claim 5, further comprising receiving a parameter input by a user, wherein the parameter includes:
   a first parameter indicating which of the first deformation shape model and the second deformation shape model is closer to the blended shape model; and
   a second parameter indicating which of the detailed shape of the top surface of the tooth template model and the detailed shape of the top surface of the tooth scan data is closer to the detailed shape of the top surface of the second deformation shape model.

7. The method of claim 1, wherein, in the generating of the deformation shape models, when a primal problem is f(x), and a dual problem is g(x), $$\arg \min_x f(x) \text{ subject to } g(x) = 0$$

is satisfied.

8. The method of claim 7, wherein a dual problem of the first deformation shape model among the deformation shape models is identical to a dual problem of the second deformation shape model among the deformation shape models.

9. The method of claim 8, wherein the dual problem of the first deformation shape model and the second deformation shape model represents a position of a tooth feature point.

10. The method of claim 9, wherein the tooth feature point includes at least one of a buccal cusp, a lingual cusp, a facial occlusal, a lingual occlusal, grooves, a marginal ridge, and a contact.

11. The method of claim 9, wherein, when a primal problem of the first deformation shape model is $f_{smooth}(x)$, a primal problem of the second deformation shape model is $f_{preserve}(x)$, and the dual problem of the first deformation shape model and the second deformation shape model is $g_{feature}(x)$, $$\arg \min_x f_{smooth}(x) \text{ subject to } g_{feature}(x) = 0 \text{ and}$$

$$\arg \min_x f_{preserve}(x) \text{ subject to } g_{feature}(x) = 0$$

are satisfied.

12. The method of claim 1, wherein a mesh topology of the first deformation shape model among the deformation shape models is identical to a mesh topology of the second deformation shape model among the deformation shape models.

13. The method of claim 12, wherein, when the first deformation shape model is $x_{smooth}$, the second deformation shape model is $x_{preserve}$, a parameter input by a user is param, and the blended shape model is $x_{blended}$, $$x_{blended} = param * x_{preserve} + (1.0 - param) * x_{smooth} \text{ is satisfied.}$$

14. An apparatus for deforming a shape of a tooth model, the apparatus comprising:
   a deformation shape model generator which generates a plurality of deformation shape models by deforming a tooth template model based on tooth scan data; and
   a shape blender which generates a blended shape model by performing mesh blending on the deformation shape models;
   wherein a detailed shape of a second deformation shape model among the deformation shape models is more complex than a detailed shape of a first deformation shape model among the deformation shape models, and
   wherein the first deformation shape model has a side surface that matches a side surface of the tooth scan data, and has a top surface in which the detailed shape is minimized.

15. A non-transitory computer-readable storage medium having stored thereon program instructions, the program instructions executable by at least one hardware processor to:

generate a plurality of deformation shape models by deforming a tooth template model based on tooth scan data; and generate a blended shape model by performing mesh blending on the deformation shape models, wherein a detailed shape of a second deformation shape model among the deformation shape models is more complex than a detailed shape of a first deformation shape model among the deformation shape models, and wherein the first deformation shape model has a side surface that matches a side surface of the tooth scan data, and has a top surface in which the detailed shape is minimized.

* * * * *